United States Patent [19]

Haeck

[11] Patent Number: 4,499,669
[45] Date of Patent: Feb. 19, 1985

[54] COMBINATION DRYER AND SURGE BIN

[75] Inventor: Paul J. Haeck, Indianapolis, Ind.

[73] Assignee: Miller Hofft, Inc., Indianapolis, Ind.

[21] Appl. No.: 430,940

[22] Filed: Sep. 30, 1982

[51] Int. Cl.³ .............................................. F26B 17/20
[52] U.S. Cl. ...................................... 34/102; 34/166; 34/168; 34/177
[58] Field of Search .................... 34/86, 102, 166, 168, 34/177, 180, 181

[56] References Cited

U.S. PATENT DOCUMENTS

| 351,432 | 10/1886 | Free et al. | 34/180 |
| 2,277,361 | 3/1942 | Bonotto | 34/37 |
| 2,388,399 | 11/1945 | Forster et al. | 34/177 |
| 2,911,730 | 11/1959 | Schaub et al. | 34/57 |
| 3,330,050 | 7/1967 | Ausherman | 34/236 |
| 3,913,238 | 10/1975 | Updegrove | 34/12 |
| 3,913,239 | 10/1975 | Burgin | 34/177 |
| 4,010,552 | 3/1977 | Peterson | 34/180 |
| 4,038,758 | 8/1977 | Miller | 34/86 |
| 4,077,134 | 3/1978 | Steffen | 34/22 |
| 4,142,302 | 3/1979 | Primus | 34/31 |
| 4,179,043 | 12/1979 | Fischer | 34/242 |
| 4,245,399 | 1/1981 | Muller et al. | 34/166 |

Primary Examiner—Larry I. Schwartz
Assistant Examiner—David W. Westphal
Attorney, Agent, or Firm—Woodard, Weikart, Emhardt & Naughton

[57] ABSTRACT

A combination surge and drying apparatus is described which includes first and second bins, a jacket surrounding the first bin for passage of a hot fluid therethrough, and air coils positioned within the jacket to be heated by the hot fluid. Air within the coils is directed into and through a hollow, apertured auger positioned to discharge material from the first bin to the second bin. An overflow port is included for returning excess material from the discharge auger back to the first bin to handle surges in demand for the material and also to facilitate drying.

12 Claims, 4 Drawing Figures

COMBINATION DRYER AND SURGE BIN

BACKGROUND OF THE INVENTION

1. Field of the Invention

The present invention relates to a bin for the drying of bulk materials, and particularly to an apparatus which operates both as a drying and as a surge bin.

2. Description of the Prior Art

A variety of containers and other pieces of equipment have been proposed to accomplish certain material handling operations. In particular instances, it is necessary to have a bin which can accommodate surges in the requirement for supply or demand of materials in a multi-step process. In other applications, drying bins or devices have been proposed to provide the requisite drying of a material either in a batch or continuous process. The prior art has not provided a single piece of equipment which efficiently operates as both a surge and drying bin in the manner of the present invention.

In U.S. Pat. No. 2,277,361, issued to Bonotto on Mar. 24, 1942, there is described a method and apparatus for steam treatment of solid materials. The Bonotto device utilizes a vertical auger system which also provides for the introduction of steam for passage through the material in the device. The Bonotto patent also describes the use of a vertical auger which delivers the solids to an overflow for discharge. In U.S. Pat. No. 351,432, issued to Free et al. on Oct. 26, 1886, there is described a vertical auger system which provides for introduction of a gas for passage through the material, and particularly one which utilizes a central tube B which has apertures so that steam or air may be introduced into the bin. Other devices showing vertical auger systems with an air inlet are contained in the U.S. Pat. Nos. 2,911,730, issued to Schaub et al. on Nov. 10, 1959, and 4,245,399, issued to Muller et al. On Jan. 20, 1981.

A storage unit for food grains which provides for circulation of air in either of two directions through the grain is described in U.S. Pat. No. 4,077,134, issued to Steffen on Mar. 7, 1978. Typical grain dryers which include augers for movement of the grain from the unit are described in U.S. Pat. Nos. 4,142,302, issued to Primus on Mar. 6, 1979, and 3,330,050, issued to Ausherman on July 11, 1967. A device of similar nature is described in U.S. Pat. No. 3,913,238, issued to Updegrove on Oct. 21, 1975.

In contrast to these and other prior art designs, the present invention provides a unique and advantageous combination of features to provide for the drying of a bulk material within a bin, while also having a discharge system for moving the material to a further processing position.

SUMMARY OF THE INVENTION

Briefly, describing one aspect of the present invention, there is provided a combination surge and drying apparatus which includes first and second bins, means for delivering material from within the first bin to the second bin, and overflow means for returning access material from the second bin to the first bin. Heat transfer means are provided about the first bin, and means are also provided for introducing a drying gas directly into the material within the first bin. In a particular aspect, the drying gas is initially passed through the heat transfer means and then is directed into the material that is received both within the first bin and within the discharge means.

It is an object of the present invention to provide an apparatus which operates as both a surge and drying device for handling bulk material.

A further object of the present invention is to provide a combination surge and drying apparatus which operates to efficiently dry a bulk material by indirect and direct methods.

It is another object of the present invention to provide an apparatus of the described type which is easy and economical to produce and operate.

Further objects and advantages of the present invention will become apparent from the description of the preferred embodiment which follows.

DESCRIPTION OF THE PREFERRED EMBODIMENT

Figure 1:
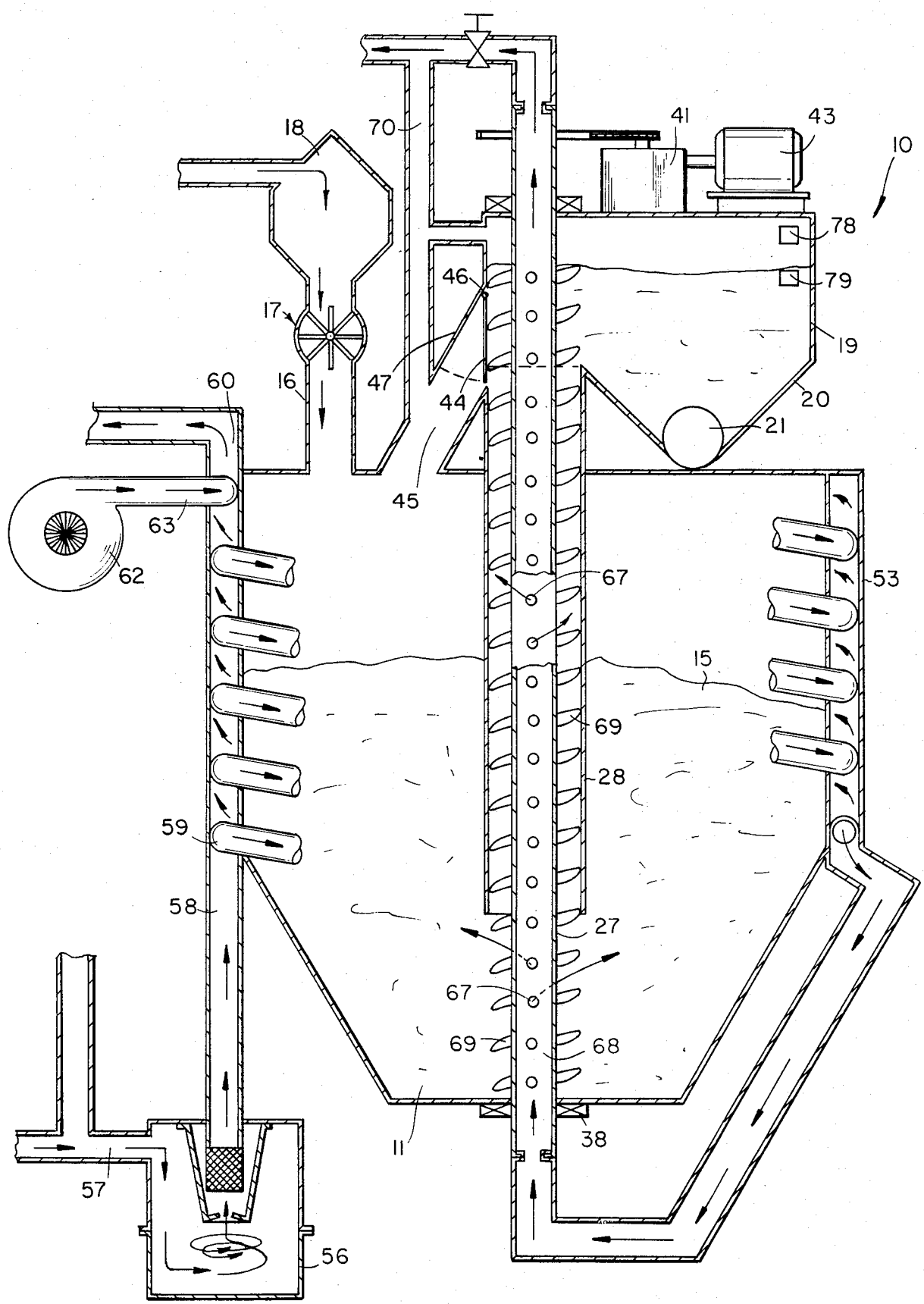
FIG. 1 is a front, partially cross-sectional view of a surge and drying apparatus constructed in accordance with the present invention, and being somewhat in schematic form.

For the purposes of promoting an understanding of the principles of the invention, reference will now be made to the embodiment illustrated in the drawings and specific language will be used to describe the same. It will nevertheless be understood that no limitation of the scope of the invention is thereby intended. Such alterations and further modifications in the illustrated device, and such further applications of the principles of the invention as illustrated therein, are contemplated as would normally occur to one skilled in the art to which the invention relates.

Referring in particular to the drawings, there is shown a combination surge and drying apparatus 10 constructed in accordance with the present invention. The apparatus includes a first, primary bin 11 received upon a supporting framework 12. The bin 11 includes a cylindrical body 13 and a tapered, conical bottom 14 to facilitate handling of a bulk material 15 received therein.

Means are provided for introducing material into the first bin. The bin 11 includes a material inlet 16 as will be apparent from the following description. In a preferred embodiment there is a gas introduced into the material 15 while it is received within the bin 11. The material inlet 16 therefore preferably includes an airlock 17 to limit the escape of gas from within the first bin and out the material inlet. Airlock devices for material feeds are well known in the art, and therefore are not decribed in detail herein. Also, any pressure within the bin would tend to counteract the introduction of material through the material inlet 16, thereby making the airlock 17 further desirable. In a preferred application, the present invention is useful in the handling of materials such as wood products, including sawdust, for delivery to a furnace or other burner. In such applications, it is also desirable to include a cyclone 18 for the separation of dust and other particles.

The first bin 11 is provided with a discharge means to move the material 15 from the first bin into a second bin 19. The bin 19 may include a tapered bottom 20 as shown in FIG. 1 to facilitate the removal of material from the bin 19 by means of a discharge conduit 21. In the preferred embodiment, the second bin is provided with a central auger 22 extending within the bin 19 and through the discharge conduit 21. Also provided are a pair of feed screws 23 and 24 which cooperate with the central auger 22 for the movement of material from the second bin 19 and into the discharge conduit 21. The auger 22 and screws 23 and 24 are driven by means of a motor 25 connected therewith by means of a gear box 26. The connection of such components, and their operation, are well understood in the art.

A central, vertical auger 27 is received within a conduit 28 for moving the material from the first bin to the second bin. The auger 27 includes a central, hollow tube 68 which is mounted to the first bin 11 for rotation about its central axis. The top of the apparatus is provided with a support 29 which comprises several reinforcing arms 30 mounted through pads 31 to the top wall 32 of the first bin. Corner reinforcements, such as 33 and 34, are provided for additional structural strength. The auger 27 extends upwardly through the top wall 32 of the first bin 11, and is secured at its uppermost end to the supporting structure 29. A housing 35, which tapers inwardly in the direction of the top of the apparatus, is secured with the top wall 32 of the first bin and encloses the upward extension of the auger.

The tube 68 is mounted at its upper and lower ends to provide for rotation about its central axis. As described, a supporting structure 29 is provided at the top of the bin 11, and this includes a central support member 36 carried by the several arms 30. The upper end of the tube 68 is bearingly mounted to the support 36. A casing 37 is mounted at the lower end of the conical bottom 14 of the bin, and bearings 38 are secured to the casing and rotatably receive the tube 68. Gears 39 and 40 are secured to the tube 68 and a gear box 41, respectively, and are interconnected with a chain or the like to drive the tube 68 in rotation. A protective housing, indicated at 42, encloses the gear drive as a safety precaution. A motor 43 is connected with the gear box 41 and operates to drive the auger.

The present apparatus provides an overflow means for returning excess material in the second bin 19 to the first bin 11. As shown particularly in FIG. 1, a flap 44 is positioned in a passageway 45 and is hinged at the upper end 46 to swing between a closed position, as shown, and an open position against the wall 47 of the passageway. The tapered housing 35 functions to define the return chutes, such as passageway 45, to recycle material back to the first bin. Suitable controls are provided to position the flap 44 in an appropriate position to either permit return of overflow material back to the first bin or to retain the material within the second bin. A pair of paddle-type bin level indicators 48 and 49 are mounted to a brace member 50 attached to the housing 35. The level indicators include paddle portions 51 and 52 which extend downwardly into the first bin 11 and provide control inputs for additional material feed for the system.

Although the apparatus may be operated in various manners, one approach is to continuously rotate the central auger 27. Under these conditions, material is continuously being moved upwardly into the area of the second bin 19. If the level of material in the second bin is low, the material will be retained therein for delivery to subsequent processing points. If the material level is sufficiently high, then the flap 44 is opened and the material is recycled back to the first bin. Since the apparatus also operates as a drying bin, it will be appreciated that the operation of the auger 27 may be desired, even though material is being recycled back to the first bin, in order to achieve the desired degree of drying of that material. In circumstances in which the level of the material in the second bin is sufficiently high and the material within the first bin is sufficiently dry, then operation of the auger is typically suspended.

A heat exchange jacket 53 surrounds the cylindrical body 13 of the first bin 11 to facilitate the drying operation of the apparatus. The jacket includes an insulated outer wall 54 encasing the cylindrical body 13 and defining therebetween a cavity 55. A hot fluid, typically flue gas, is circulated through the cavity 55 to provide heat transfer directly or indirectly to the material within the first bin.

In the preferred embodiment, a fly ash collector 56 is positioned to receive flue gas through an inlet 57. The collector 56 operates in typical fashion to separate and collect the ash from the flue gas so that a minimum amount is introduced into the cavity 55. The flue gas is directed from the collector 56 through a jacket inlet 58. Within the jacket are preferably received a series of helically configured tubes 59 which are positioned such that the flue gas is circulated spirally through the cavity 55 and to an outlet 60. This construction provides for a substantial residence or contact time of the hot flue gas with the first bin 11, and also with the tubes 59. Alternatively, the flue gas may be directed through a bypass conduit 61 at those times when circulation of the gas through the jacket cavity is not required. Suitable controls and valving are well known in the art for diverting the flue gases through the bypass conduit, and are therefore not described herein.

A blower 62 is mounted on the top wall 32 of the first bin and communicates through an outlet 63 with the spiraling tubes 59. Air is blown through the tubes 59 and thereafter passes through an outlet 64. The air is passed from the outlet 64 to an inlet 65 directed to the interior of the casing 37. The hollow tube 68 of the auger 27 includes an aperture 66 positioned within the casing 37 and thereby receives the hot air which is passed into the casing 37. In this manner, the air introduced from the blower 62 is circulated through the cavity 55 and heated by the flue gas surrounding the tubes 59. This hot air is then introduced into the casing 37 and from there into the interior of the hollow tube 68. The conduit includes several apertures 67 along its vertical extent and the hot air passes upwardly through the hollow conduit and out through the apertures 67 into the material 15.

Figure 2:
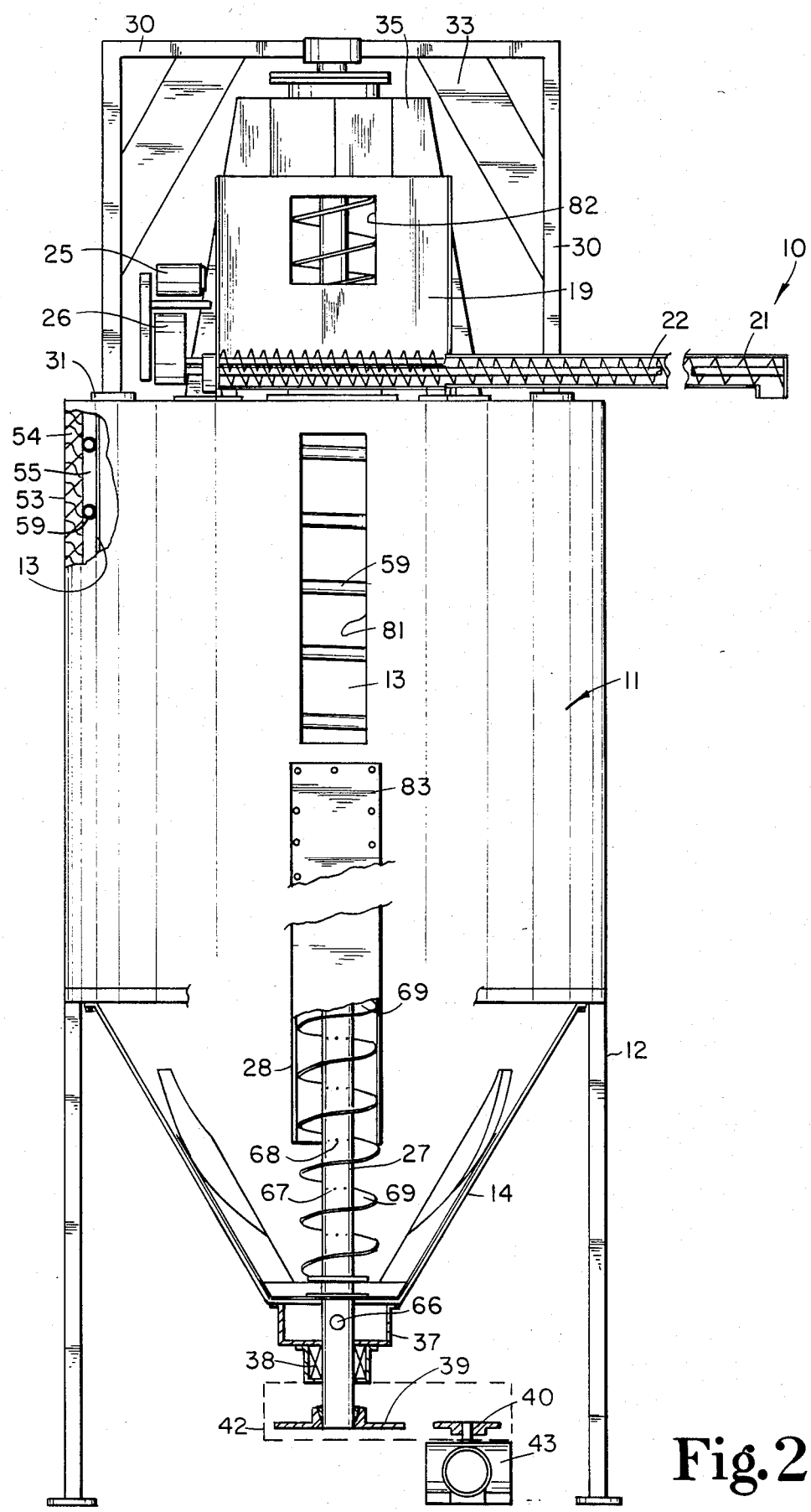
FIG. 2 is a side, elevational view of a surge and drying bin constructed in accordance with the present invention, and particularly having portions broken away to reveal the interior details of the apparatus.
Figure 3:
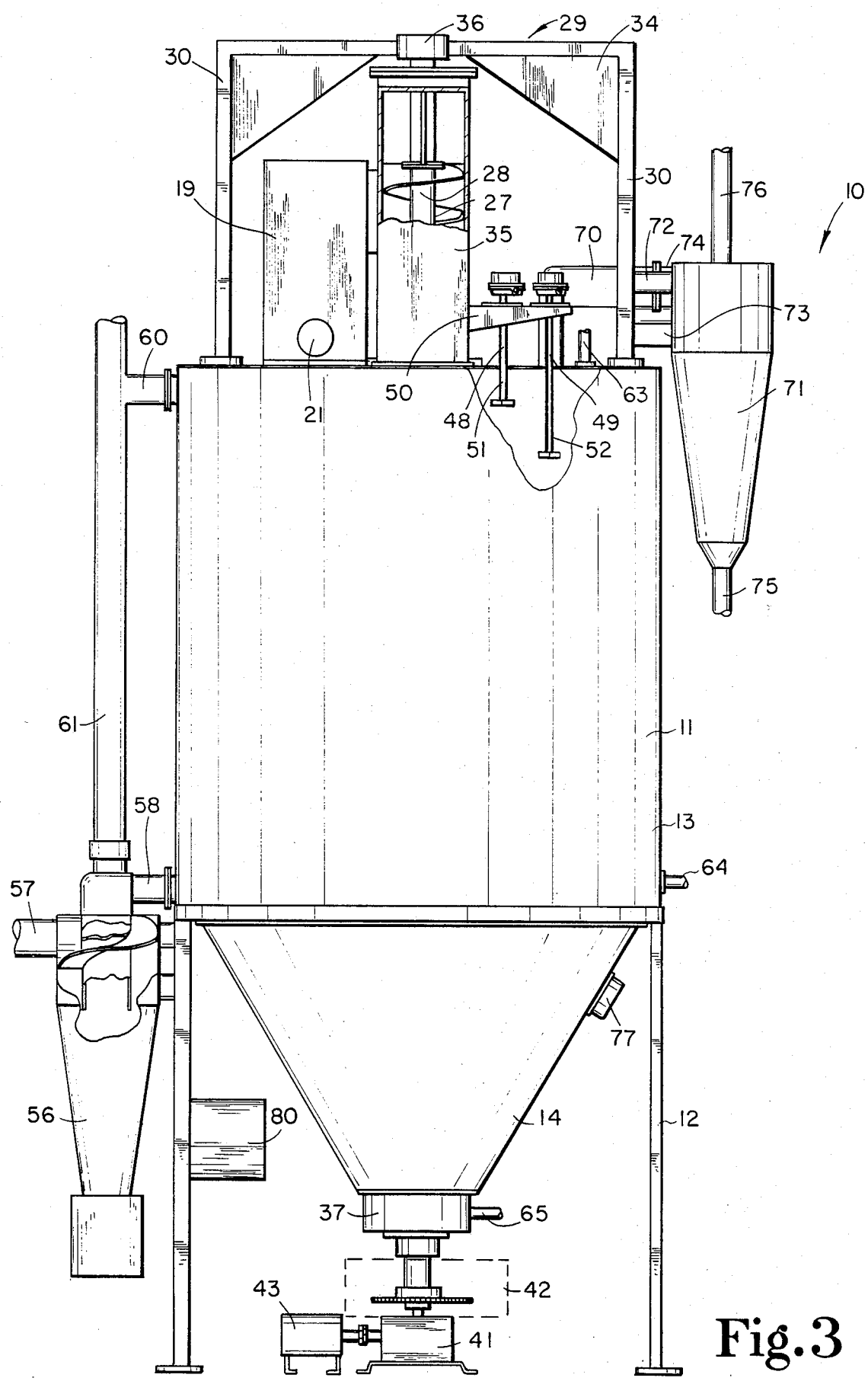
FIG. 3 is a front, elevational view of the apparatus of FIG. 2, also showing portions broken away to reveal interior details.
Figure 4:
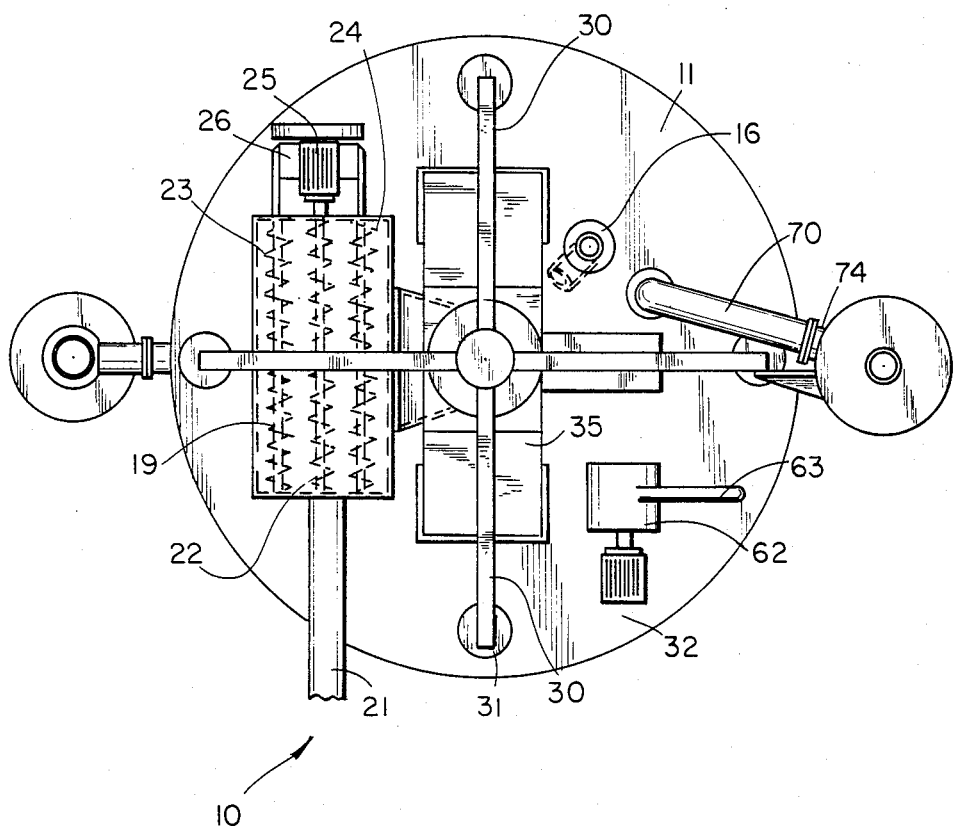
FIG. 4 is a top, plan view of the apparatus of FIG. 2.

As shown particularly in FIGS. 1 and 2, the conduit 28 extends only a part way down into the first bin 11. The auger 27 includes a hollow, cylindrical tube 68 having the several holes 67 extending therethrough and also having a plurality of blades 69 mounted thereon. The apertures 67 are located at various points along the length of the tube 68, being located both below and within the conduit 28. It will therefore be appreciated that the hot air passing upwardly through the tube 68 will pass outwardly into the material both within the first bin 11 and within the conduit 28.

The air that passes through the material 15, whether in the first bin 11 or in the conduit 28, is discharged from the apparatus through an exhaust outlet 70. A dust separator 71, such as a centrifugal cyclone separator is secured to one of the legs 30 by a pair of support members 72 and 73. The inlet 74 of the dust separator 71 is connected with the exhaust outlet 70 to receive the air passed through the material. The dust separator 71 operates in typical fashion to remove the dust and other particulate matter through a first outlet 75, while directing the air exhaust through a second outlet 76.

As described, there is provided a combination surge and drying apparatus for use in handling a bulk material, typically a material consisting of comminuted or other particulate matter. A preferred application for the described apparatus is in the handling of wood chips and the like for drying prior to delivery to a furnace. However, it will be appreciated that the apparatus will function equally well for a variety of materials that require to be dried and particularly also will be used in a subsequent operation in which surges in the availability and/or demand for the material will occur.

The apparatus utilizes a relatively large first bin 11 which operates to store an inventory of the material 15 while also working the material to achieve desired drying. The apparatus also includes a smaller, second bin 19, positioned above and mounted upon the first bin, to receive the material from the first bin and deliver it to a subsequent processing point.

Efficient means are provided for drying the material processed by the apparatus. In a broad sense, the drying of the material is accomplished in a first instance by transferring heat to the material from a jacket surrounding the bin, and in a second instance by passing a drying gas directly into and through the material prior to its discharge from the first bin. In particular, the gas is preferably passed through the material in one or both of the first bin and the discharge conduit 28. In the latter case, the drying air is provided at a higher ratio with respect to the amount of material, thereby enhancing the drying capacity for the material being discharged to the second bin. By the provision of a recycle of material from the conduit 28 back to the bin 11, the apparatus operates both to handle surges in demand for the material and to increase the efficiency of the drying process. As previously indicated, the operation of the auger 27 and the application of drying means can be coordinated to achieve adequate drying of the material along with adequate supply of material to the second bin for delivery to further processing points.

In the preferred embodiment, the apparatus includes separate, but cooperating, heat transfer fluids. It will be appreciated that in an alternate embodiment a hot gas could be passed directly through the jacket cavity 55 and then into and through the material 15 without the use of a second gas or liquid. However, flue gases are typically available, especially when the apparatus is used in conjunction with a furnace, and these gases provide a ready and free source of heat for use in the drying operation. However, it will likely be undesirable to pass the flue gas directly through the material 15, even after the flue gas has passed through a fly ash collector such as shown at 56. Thus, the preferred embodiment provides for the use of this flue gas to directly transfer heat through the walls of the first bin and into the material, and also to heat the air passing through the tubes 59 so that this heated air can then be passed through the material directly.

Having described the purpose and function of the present invention, the types and uses of various controls and sensors for operation of the invention will be apparent to those skilled in the art. For example, various temperature sensors may be utilized to determine the operating characteristics and demands for the apparatus in order to achieve desired drying of the material therein. Sensors may typically be located at the inlet 57 to the fly ash collector, the outlet 60 from the jacket cavity 55, the air outlet 63 from the blower 62, the interior of the casing 37, and the outlet 70 from the first bin. Pressure sensors may also be positioned at the inlet 57 of the fly ash collector 56, the outlet 63 of the blower 62, and the inlet 65 leading to the casing 37.

A pressure-type bin level indicator 77 is located on the conical bottom 14 of the first bin to monitor the level of material within the first bin. As previously indicated, paddle type level indicators 48 and 49 are also positioned in the first bin. It is also desirable to include a moisture indicator and a bin level indicator, as shown at 78 and 79, respectively, in the second bin to monitor the material therein. Appropriate controls are operated in response to measurements of these various indicators, and a control panel 80 is also typically included for this purpose.

In addition to the structure previously described, certain additional features may be included to facilitate operation of the device. For example, vertical ports, such as 81 and 82, are positioned along the first and second bins for access purposes, and are covered by access panels, such as 83. Other structural detail may be included depending upon the size and application for an apparatus as described.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination surge and drying apparatus for use in handling a bulk material, which comprises:
   first and second bins, said second bin being located above said first bin;
   heat transfer means, surrounding at least a portion of said bin, for providing heat transfer from a hot fluid within said heat transfer means to the material received within said first bin;
   discharge means for receiving and discharging material from within said first bin into said second bin;
   gas introduction means for directing a drying gas into the material within sid first bin prior to discharge of the material from said first bin;
   overflow means for returning excess material in said second bin to said first bin, said overflow means including a passageway communicating between said first bin and said second bin separately from said discharge means; and
   control means for controlling the passage of material through said overflow means, whereby material is selectively maintained within said second bin or is allowed to pass through said overflow means back to said lower, first bin.

2. The apparatus of claim 1 in which said discharge means includes a conduit extending between said first bin and said second bin and an auger received within the conduit and positioned to draw material from within said first bin into the conduit and to deliver the material to said second bin.

3. The apparatus of claim 1 in which said gas introduction means is for directing a drying gas into the material while it is received within the discharge means.

4. The apparatus of claim 3 in which said discharge means includes a conduit extending between said first bin and said second bin and an auger received within the conduit and positioned to draw material from within said first bin into the conduit and to deliver the material to said second bin.

5. The apparatus of claim 4 in which the auger includes a central, hollow tube having several holes extending therethrough and having a plurality of blades mounted thereto, said gas introduction means including gas delivery means for delivering the drying gas to the interior of the hollow tube of the auger for passage through the holes in the tube and out into the material within the conduit.

6. The apparatus of claim 1 in which said gas introduction means is for delivering a drying gas into the material while it is received within said first bin.

7. The apparatus of claim 6 in which said first bin includes a material inlet means including a material inlet for permitting introduction of material into said first bin and for providing an airlock to limit the escape of gas from within said first bin out the material inlet.

8. The apparatus of claim 6 in which said gas introduction means is also for directing the drying gas into the material while it is received within the discharge means.

9. The apparatus of claim 8 in which said discharge means includes a conduit extending between said first bin and said second bin and an auger received within the conduit and positioned to draw material from within said first bin into the conduit and to deliver the material to said second bin.

10. The apparatus of claim 8 in which said discharge means includes a conduit extending between said first bin and said second bin and an auger received within the conduit and positioned to draw material from within said first bin into the conduit and to deliver the material to said second bin.

11. The apparatus of claim 10 in which said gas introduction means includes gas delivery means for delivering the drying gas into the material while it is received within said discharge means.

12. The apparatus of claim 11 in which the auger includes a central, hollow tube having several holes extending therethrough and having a plurality of blades mounted thereto, said gas introduction means including gas delivery means for delivering the drying gas to the interior of the hollow tube of the auger for passage through the holes in the tube and out into the material within the conduit.

* * * * *